Figure 1:
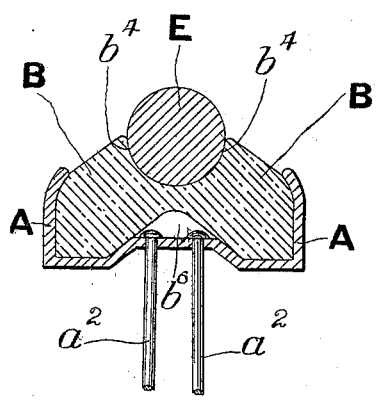

No. 607,986. Patented July 26, 1898.
A. DAVY & T. G. S. ROGERS.
GRIP PULLEY.
(Application filed Dec. 30, 1896.)
(No Model.)

Witnesses:

Inventors:
Alfred Davy
Theodore George Stewart Rogers
By Richard
their Attorneys

UNITED STATES PATENT OFFICE.

ALFRED DAVY AND THEODORE GEORGE STEWART ROGERS, OF LONDON, ENGLAND.

GRIP-PULLEY.

SPECIFICATION forming part of Letters Patent No. 607,986, dated July 26, 1898.

Application filed December 30, 1896. Serial No. 617,509. (No model.) Patented in England October 1, 1896, No. 21,736.

*To all whom it may concern:*

Be it known that we, ALFRED DAVY, engineer, of 4 Woburn place, London, W. C., and THEODORE GEORGE STEWART ROGERS, merchant, of 5 Great Winchester street, London, E. C., England, subjects of the Queen of Great Britain, have invented certain new and useful Improvements in Grip-Pulleys, of which the following is a specification.

The invention has been patented in England, No. 21,736, dated October 1, 1896.

Our invention has for its object improvements in the mode and means for transmitting power by wheels, belts, chains, cords, and the like as the connecting medium between the driving and driven wheel or wheels and by which we obtain a flexible grip upon the belt which is practically noiseless and which is not liable to slip or backlash, as are chains on ordinary sprocket-wheels and geared wheels.

We make our wheels with hubs, arms, and under or inner back portions of the rims from metal or other material, very much as they are now constructed; but the outer portion of the rim is shaped and constructed to receive an internal pad or pads or lining medium formed from india-rubber or other elastic substance or india-rubber made up with layers of textile material or interwoven with threads of silk, flax, hemp, wire, or the like. This lining medium may be of solid india-rubber or other elastic material or combined with threads of silk, flax, hemp, wire, or the like and laid in the wheel in segments or short pieces, or they may be continuous rings fitted or sprung into the wheels and cemented into grooves or recesses formed to hold them with the bearing portions protruding in a suitable shape or shapes in such a manner as to fold upon the belt and form a contracting groove laterally bearing against and gripping the transmitting belt, cord, or other driving medium.

The tires or linings may be plain or have projections or corrugations on their surfaces to increase the grip on the belts, cords, or other driving medium.

In these new wheels and mode of construction the greater the strain put upon the belt for driving the tighter it is gripped by the elastic lining. Consequently they are very suitable for driving cycles and motors and vehicles of various kinds; but the invention may also be applied to machinery generally, as will be well understood.

In order that our invention may be clearly understood and more easily carried into practical effect, we have appended hereunto drawings upon which we have illustrated a number of examples which will be sufficient to make the principle of our invention known and by which others may be enabled to apply the same to the varying circumstances and conditions met with in practice.

Figure 2:
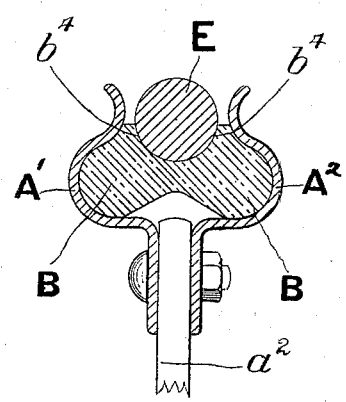
Figure 3:
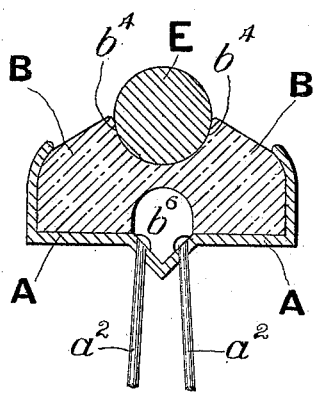
Figure 5:
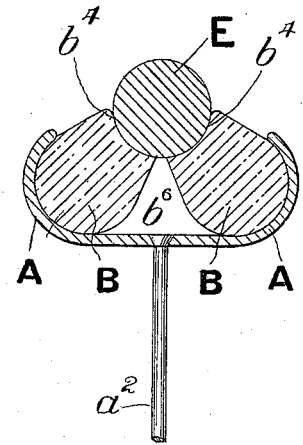
Figure 4:
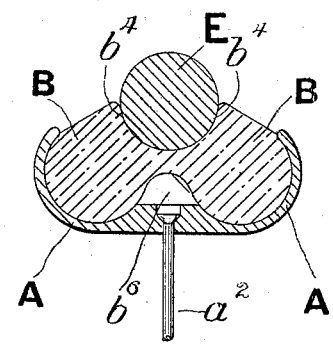
Figure 6:
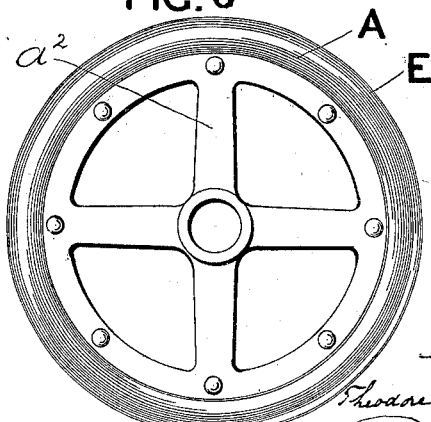

Figure 1 is a cross-section through the rim A of a wheel, the working periphery of which is formed by the solid lining B, having the groove $b^4$ to receive the driving medium E. Fig. 2 is also a cross-section through the rim of a wheel formed in two parts A and A', with its lining B formed at $b^4$ to receive the driving rope, band, or other medium. Fig. 3 is another cross-section through a differently-shaped rim A, having a flat base for the solid lining B to fit into, which is formed at $b^4$ to receive the driving medium, whether rope, band, or chain. Fig. 4 is a cross-section showing the rim A formed with curved edges to receive the lining B, which is shaped to correspond. Fig. 5 is a cross-section showing the rim A formed without the thickening in the center for the spokes, the lining B, which fits into the rim, being formed in two parts with curved edges to receive the driving medium E. Fig. 6 is a full view of the wheel or pulley as shown at Fig. 2.

Our improved mode and means for transmitting power consist of wheels with flexible linings made from india-rubber or other elastic substance, either solid or made up with layers of textile material or interwoven with threads of silk, flax, hemp, wire, or the like, and the driving-bands are made in like manner from the like material, though it will be understood that bands or guts or ropes or chains of ordinary construction and make may be applied to our wheels with similar effect.

The wheels may be made with metal or wood rims A and tension-arms $a^2 a^2$, or they may be disk wheels. The rims A may be made solid, as shown in drawings, or in separate parts, and are formed to receive the elastic linings and are shaped suitably for that purpose after the examples given.

In Fig. 1 we show the solid lining B mounted in the rim A, which has a slight channel formed on each side internally, in which the lining B fits, with the space $b^6$ formed in the lining, which space permits the said lining to sink or give when the pressure of the driving-belt E is applied, thus allowing the sides to close or sink inward, and so causes the belt to be firmly gripped.

In the sample given by Fig. 2 we have shown the rim formed in two parts A' and A², bolted to an arm or web $a^2$.

In all the remaining figures upon the drawings india-rubber or composition linings made up as hereinbefore described are placed, but they may be modified in shape, so as to obtain more or less flexibility. In the case of Figs. 3 and 4 the arch or space leaves the thickness of rubber comparatively small, which would allow the sides of the groove under pressure to come inward. In other respects the variations in section are indicated sufficiently upon the drawings as suggestive of what might be done in carrying our invention into practice.

Fig. 5 shows the lining in two rings or separate parts, and it will be understood that generally the linings may be made up of either continuous rings or in sections or pieces.

What we claim is—

A pulley comprising a rim having side channels, and a rubber cushion comprising lateral parts of solid rubber bearing in the channels with a space $b^6$ between said lateral parts and with a groove for the band, said space $b^6$ being between the cushion and the rim, substantially as described.

In testimony that we claim the foregoing as our own we have affixed our names in the presence of two witnesses.

ALFRED DAVY.
THEODORE GEORGE STEWART ROGERS.

Witnesses:
G. T. ROGERS,
A. E. GIBSON.